Sept. 26, 1950 E. E. K. SPARMANN 2,523,599
TWO-CYCLE ENGINE SLEEVE VALVE CONTROL OF SCAVENGING
Filed Nov. 26, 1946 2 Sheets-Sheet 1
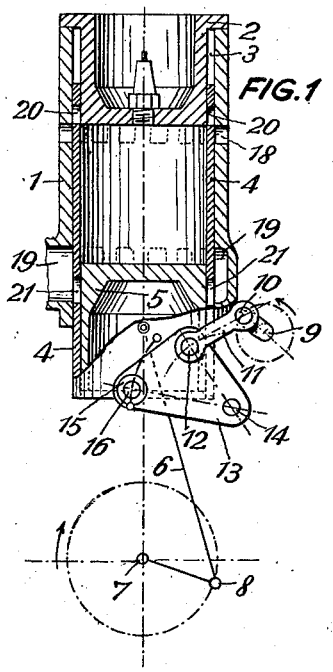
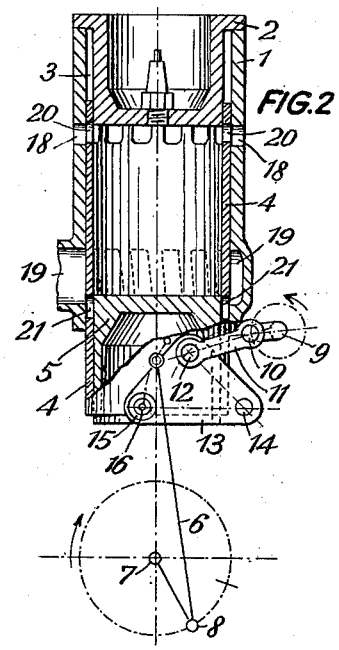
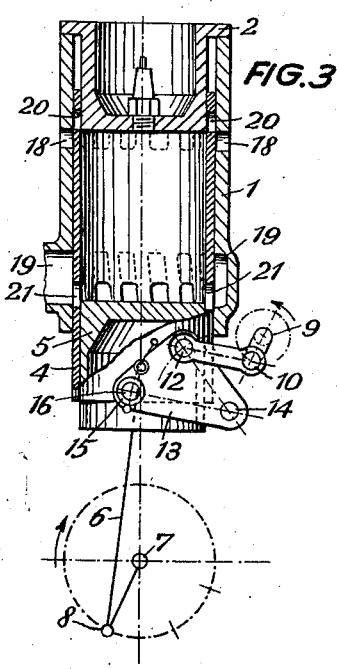
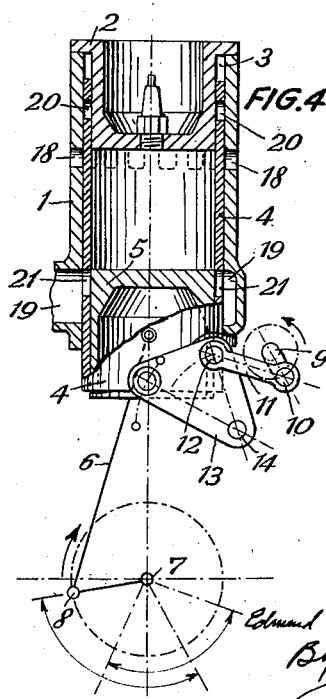
INVENTOR:
Edmund Ernst Karl Sparmann
By his Attorney Sept. 26, 1950     E. E. K. SPARMANN     2,523,599
TWO-CYCLE ENGINE SLEEVE VALVE CONTROL OF SCAVENGING
Filed Nov. 26, 1946     2 Sheets-Sheet 2
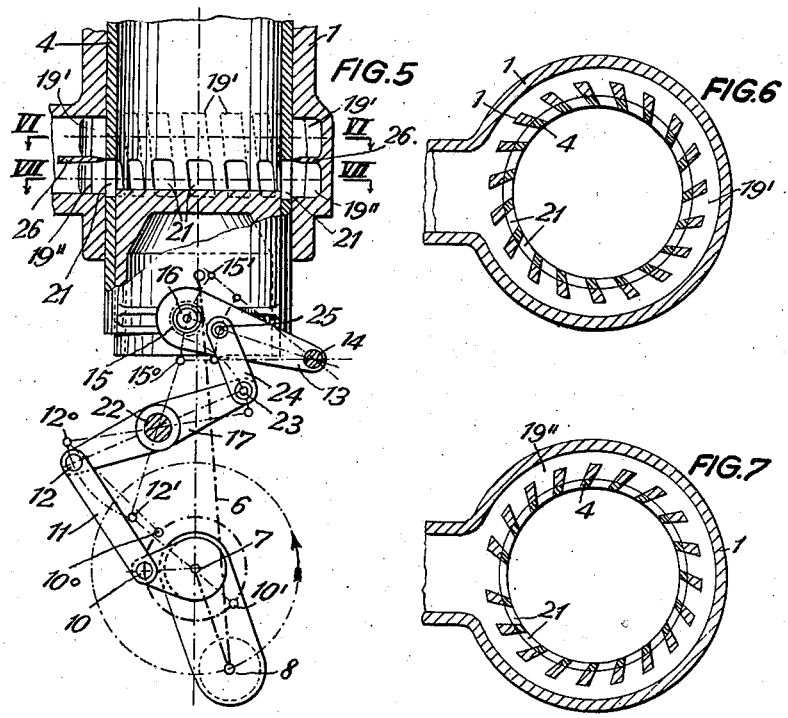
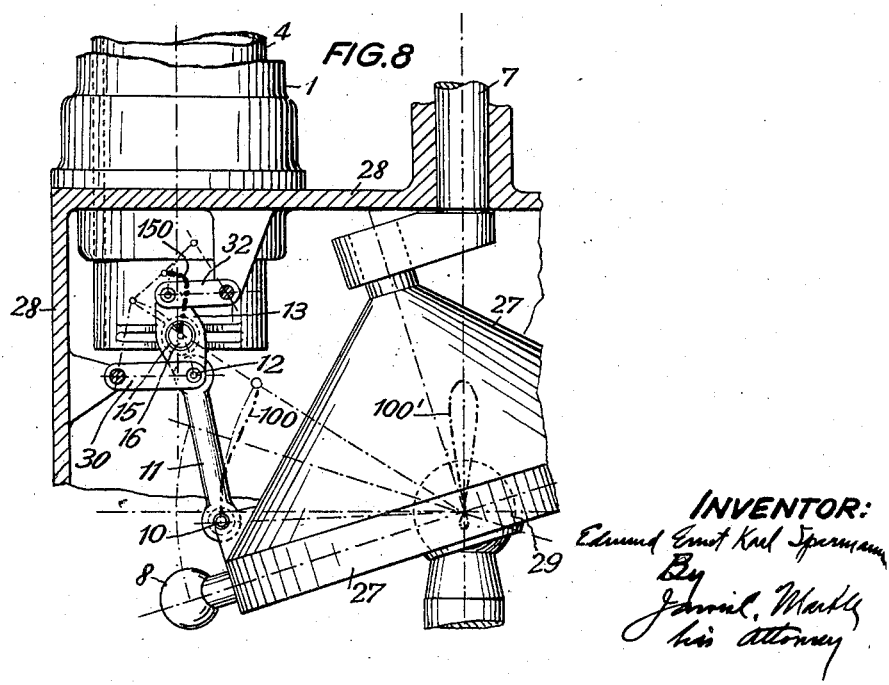
INVENTOR:
Edmund Ernst Karl Sparmann
By
his attorney Patented Sept. 26, 1950

2,523,599

UNITED STATES PATENT OFFICE 2,523,599

TWO-CYCLE ENGINE SLEEVE VALVE CONTROL OF SCAVENGING

Edmund Ernst Karl Sparmann, Stockholm, Sweden

Application November 26, 1946, Serial No. 712,365
In Sweden November 27, 1945

15 Claims. (Cl. 123—65)

1

The present invention relates to two-cycle motors and particularly to a novel control of the inlet and exhaust ports of such motors, and has as its main object to avoid to a great extent certain disadvantages which so far have been inherent in two-cycle engines.

According to the present invention, the two-cycle motor comprises, in combination, a working cylinder provided with exhaust ports near its outer end which are controlled by openings of a sleeve valve surrounding the piston and periodically passing said ports, and with inlet or scavenging ports near its inner end which are controlled by the combined movement of the upper edge of the piston and of openings provided in the sleeve valve and periodically passing said ports, means being provided to impart to each point of the sleeve valve an oscillatory movement at least partially deviating from the direction of the axis of the cylinder, said oscillatory movement being considerably accelerated in axial direction during the scavenging period, but having a small acceleration in axial direction during the compression and combustion periods, when the inlet and exhaust ports in the cylinder are closed, the movement of the sleeve valve being slightly in advance of the movement of the piston.

There have already been proposed two-cycle engines with sleeve valve control which are provided with certain of the above features in combination with other arrangements, resulting however in direct disadvantages or dangerous conditions of operation, or which exclude the possibility of obtaining motors with high power ratings. The combination of all the features according to the present invention results in a considerable improvement of the scavenging process and in a more reliable operation, even for highly rated two-cycle motors, that is to say, with motors running at high speed and operating at high effective pressures, or highly supercharged.

The accompanying drawings show by way of example and diagrammatically some of the numerous practical embodiments of the present invention, and the manner of application of the invention to different types of motors, such as motors with the cylinders arranged in line, radial cylinder motors or wobbler engines having the working cylinders disposed axially around the engine shaft.

Figs. 1, 2, 3 and 4 each show an axial section through the working cylinder of a two-cycle engine according to the invention at different positions of operation of the piston; the arrangement

2 shown can be used for one-cylinder engines or for engines having the cylinders disposed in line.

Fig. 5 shows the lower portion of a working cylinder according to a modification which may be used for one-cylinder engines or for radial cylinder motors. This example further discloses means for improving the scavenging process or for supercharging the cylinder.

Figs. 6 and 7 show transverse sections through the working cylinder along the lines VI—VI, and VII—VII, respectively, of Fig. 5.

Fig. 8 represents a modification of the invention for use with wobbler engines.

In Figs. 1 and 4 the working cylinder 1 is shown in axial section; its cylinder head penetrates like a plug into the upper portion of the cylinder, while a narrow annular space 3 is provided between the head and the cylinder wall. The upper end of a sleeve valve 4 disposed between the piston 5 and the cylinder wall, is slidably engaged in the space 3 so as to be gas tight. The piston 5 reciprocates within the sleeve valve 4 and is connected by the connecting rod 6 and the crank 8 to the motor shaft 7.

In Figs. 1 to 4 a smaller crank drive is represented in proximity to the base of the cylinder, this crank drive having a crank shaft 9 which will be called control shaft hereinafter, and a crank pin 10. The control shaft 10 is driven in any conventional manner, not illustrated, by the motor shaft 7, and with the same number of revolutions as the motor shaft, but not necessarily in the same direction. In Figs. 1 to 4 the control shaft 10 and the motor shaft 7 are assumed to turn in opposite directions, as indicated by the arrows on the figures.

The crank pin 10 is connected to a small connecting rod 11 which imparts an oscillating motion to an arm 13 pivoted on a pin 14. The pin 14 is mounted on any suitable stationary part of the motor. The connecting rod 11 is articulated by means of a pin 12 on the oscillating arm 13. The oscillating arm 13 is connected by means of an universal joint 15 to a radially projecting cylindrical bolt 16 of the sleeve valve 4, the universal joint 15 being at the same time axially slidable on the bolt 16. Naturally, the bolt could also be arranged on the oscillating arm and would then be axially slidable in an universal joint mounted on the sleeve valve.

As seen from Figs. 1 to 4, particularly from Fig. 2, the crank pin 10 is angularly displaced through approximately 180° relative to the crank pin 8 of the motor shaft, so that when the crank pin 8 of the motor shaft 7 is in proximity of the lower (inner) dead center, then the crank pin 10 of the control shaft is near its outer dead center.

This phase displacement of the two crank drives has the effect that the axial acceleration of the sleeve valve 4 reaches a maximum, while the motor piston 5, in proximity to its lower dead center, has a relatively small acceleration, and vice versa. By a suitable selection of the different angles and of the ratios in the crank and link mechanism for the sleeve valve motion, this inverse relation of acceleration between the sleeve valve and the piston can still be considerably increased. Such an arrangement makes it possible, even with a relatively small stroke of the sleeve valve, to obtain relatively great flow sections of the inlet and exhaust ports. This result, in combination with the principle of unidirectional flow of scavenging here used, permits an effective scavenging and a good charge of the working cylinder. Naturally, the sleeve valve will have a small advance relative to the piston. The sleeve will pass its lower (inner) dead center about 5° to 40° ahead of the working piston.

The control of the exhaust and inlet ports is effected in the following manner: A series of exhaust ports 18 is provided in the upper portion of the cylinder 1, and a series of inlet or scavenging ports 19 is provided at the lower end of the working space in the cylinder. The ports 19 can be in communication with the crank case, if the latter is used for scavenging, or they can be connected to a separate scavenging pump or to a compressor. Also the sleeve valve 4 is provided with two series of openings 20 and 21 the axial distance between the two series corresponding substantially to that between the exhaust and inlet ports in the cylinder and will be varied according to the control diagram desired by the engine designer. The openings 20 in the sleeve 4 cooperate with the exhaust ports 18, and the openings 21 with the inlet ports 19.

In Fig. 1 the motor cylinder is diagrammatically drawn in a position in which the exhaust ports 20 of the sleeve valve 4 just emerge from their protected and cooled position in the annular space 3 between the cylinder wall and the cylinder head, in which they move during the compression and expansion periods. When the motor shaft 7 turns in the direction of the arrow, the exhaust ports now open always further. Though the piston 5 is already slightly below the upper edge of the scavenging and inlet ports 19 at the bottom of the cylinder, the inlet openings 21 of the sleeve valve 4 are still closed by the piston. Owing to the greater crank radius and to the greater angular distance of the crank pin 8 from its lower dead center, the piston 5 now moves relatively faster than the sleeve valve 4.

In Fig. 2 the piston 5 has caught up with the movement of the sleeve valve 4 to the extent that upper edge of the piston is at the same level as the upper edge of the inlet openings 21 of the sleeve valve. The movement of the sleeve is now extremely slight, because its crank drive, as chosen in the represented example, is only about 5° before its dead center position, but the crank pin 8 of the motor shaft is still about 20° before its lower dead center position. Meanwhile the exhaust ports 18 in the upper part of the cylinder have been continuously uncovered by the outlet openings 20 of the sleeve 4, and the major portion of the exhaust gases can have left the cylinder space before fresh air or combustible mixture can enter the cylinder at the lower end of the working space and expel the remainder of the burnt gases through the still considerably opened exhaust ports at the top of the cylinder, the scavenging system operating according to the principle of unidirectional flow having proved to be the most effective system.

In Fig. 3 the sleeve 4, owing to its advance and to its greater relative acceleration, has travelled so far that the outlet openings 20, of the sleeve 4 start to enter the annular space 3 between cylinder wall and cylinder head, and accordingly the exhaust openings in the cylinder are completely closed again, while the phase displacement between piston and sleeve movement, and the characteristics of the sleeve motion, function to first fully open the inlet ports 19 and then to gradually close them, since the upper edge of the piston head reaches the upper edge of inlet openings 21.

This position is represented in Fig. 4, in which the working space of the cylinder is also closed at the bottom and compression starts. The exhaust openings 20 in the sleeve valve have in the meanwhile moved upwardly so far that the sleeve 4 ensures a tight closure at the top of the cylinder, while during the entire compression and combustion periods the end of the sleeve provided with the outlet openings moves between the cooled surfaces of the cylinder head and the cylinder wall, so that the portion of the sleeve which is exposed to extreme heating during the exhaust period will be effectively cooled for a relatively long period.

In the example represented in Figs. 1 to 4 it is not a question of obtaining an optimum for the high efficiency of the scavenging diagram, illustrated on the crank circle of Fig. 4. The exhaust opens at about 70° before lower dead center, the inlet or scavenging opens only 40° later, thus about 30° before lower dead center of the piston movement; afterwards during about 55° the exhaust and the inlet are both open, the exhaust ports closing about 25° after lower dead center, and only 60° later, at about 85° after lower dead center the inlet ports also close. The relatively long period of pre-exhaust, the considerable period of admission or supercharging, if desired, the scavenging according to unidirectional flow, in combination with the relatively large open flow sections, permit an efficient scavenging and emptying of the cylinder of combustion gases and considerable lowering of the gas pressure before the admission of fresh air or fresh combustion mixture, and the scavenging and admission is effected without any change in direction of flow along the shortest path. The relatively long admission period provides a high degree of filling of the working space before the beginning of the compression period, or when using a compressor, an effective supercharging, enabling high outputs to be obtained or maintenance of the capacity at high altitudes.

A further feature of the invention consists in the fact that the movement of the sleeve valve is not only characterised by a particular acceleration at a predetermined point of its stroke, but that the sleeve effects an oscillatory movement along a path which deviates from the axial direction. It is advantageous to shape the path of this oscillatory movement of the sleeve in such manner that during the scavenging period this path deviates less from the axial direction than during the compression and combustion periods. By this provision a number of substantial advantages are realised as compared with similar known sleeve valve control systems, while at the same time the deficiencies of these known control systems are avoided. A movement of the sleeve valve which is parallel to the axis, has the disadvantage of favoring the formation of scores or burrs on the sleeve or on the piston, and catching of the piston rings on the edges of the ports. The circular sleeve movement (for example according to Burt McCollum, Ricardo or others) has the disadvantage that the effective maximum flow section of the ports is considerably smaller than the sectional areas of the openings provided in the sleeve and in the cylinder. The effective sectional areas of flow not only remain smaller, but result in a throttling of the gas flow and disturb this flow by creating a turbulence, even when the ports and openings are situated relative to each other in the position for maximum opening. Moreover the transverse movement, that is, the tangential component of the sleeve movement, is undesirably great from the standpoint of the construction and operation of the sleeve drive. On the other hand, the circular movement of the sleeve has the great advantage of a good redistribution of the lubricating oil film and results accordingly in an improved lubrication, and in a more uniform distribution of temperature over the circumference of the sleeve valve, as well as the piston and the cylinder, while scoring of the sleeve and piston, and catching of the piston rings is avoided.

The combination of the particular conditions of acceleration of the sleeve movement with a certain predetermined path of this movement, according to the invention, not only incorporates at the same time the advantages of the different known systems and avoids their disadvantages, but in addition to this, the movement of the sleeve valve during the scavenging period, that is, while the ports are open, deviates little from the axial direction, and when the ports are closed deviates relatively more from this direction, so that the axial component of the sleeve movement is relatively greater when the ports are open and it is desired to attain quickly openings of large section, while the axial component of the sleeve motion is further reduced by the greater deviation from the axial direction when the ports are closed and an axial movement of the sleeve valve is not desired, because this movement only increases the length of the stroke and therefore the overall height of the motor. The tangential amplitudes of the sleeve motion can be maintained without difficulty within limits not resulting in any disadvantages, as it can be the case in the Burt McCollum construction. The design of the sleeve drive mechanism for obtaining the particular conditions of acceleration or the desired paths of the sleeve motion is not limited to any determined constructions and can be otherwise than illustrated. In Figs. 1 to 4 the sleeve movement is obtained by the particular control shaft 9 and the oscillatory arm 13 pivoted on the pin 14, so that the connecting point 15 on the sleeve 4 oscillates along a circular arc and all points of the sleeve valve accordingly describe circular arc-shaped paths.

Also in the example according to Fig. 5, all points of the sleeve valve 4 oscillate along circular paths. In this example, however, no special control shaft is provided for moving the sleeve, which is driven by a crank or eccentric 10 on the motor shaft 7, having a smaller radius than the crank 8 for the piston and being correspondingly displaced in phase relative to this crank. In order to obtain the particular conditions of acceleration of the sleeve valve 4, the motion transmission between the crank 10 and the sleeve valve comprises a pivoting lever 17 mounted on a journal pin 22 and connected to the crank 10 by a connecting rod 11, and to the oscillatory arm 13 by a link 24 articulated at 23 to the lever 17 and at 25 to the arm 13. An universal joint 15 on the end of the arm 13 is connected to the sleeve 4 as in the previous example, by slidably engaging a pin 16 projecting from the bottom of the sleeve.

Fig. 5 only illustrates the lower portion of the working cylinder 1 and of the sleeve valve 4. The reversal of the conditions of acceleration of the sleeve movement is obtained in this example in principle by means of the pivoting lever 17, and by corresponding selection of the angle between the connecting rod 11 and the lever 17, as well as between the lever 17, the link 24 and the oscillatory arm 13, forming toggle joints, the conditions of acceleration or the dead center positions of the sleeve can still be further modified, that is to say, a comparatively greater acceleration of the oscillatory sleeve movement can be obtained at the lower dead center than at the upper dead center. The arrangement illustrated is particularly suitable for radial cylinder engines, or for one-cylinder engines when the use of a special control shaft is to be avoided.

Fig. 5 also shows how the designer, if he desires, can make use of the unsymmetric control diagram to proceed first with scavenging by pure air in carburetted motors, and charge or supercharge only afterwards with combustible mixture, when by timely closure of the exhaust ports there is no possibility of a loss of fresh gases. The annular inlet conduit at the bottom of the cylinder can then be divided by a partition 26 in two superposed separate conduits 19' and 19''. In order to obtain a thorough mixture, the wall sections between the inlet ports can be formed as guide blades which, for increasing the turbulence of the incoming gas stream, can be oppositely inclined relative to the center of the cylinder in the two superposed series of ports, or at least the directions of flow of two superposed ports will deviate one with respect to the other, as shown in Figs. 6 and 7.

Besides the arrangements shown in Figs. 1 to 4 and 5 for obtaining the characteristic motion and acceleration conditions for the sleeve valve according to the invention, many other modifications and combinations may be used, by the provision of guide levers, slot and crank drives, toggle joints or other guide link motions.

A further modification is shown by way of example in Fig. 8 which moreover discloses the application of the invention to wobbler engines having cylinders 1 disposed around the motor shaft 7 in a direction parallel to the shaft. The characteristic motion of the sleeve valve 4, of which the lower portion is represented only, can be obtained in this case in extremely simple manner by directly coupling the wobbler plate 27 at a point 10 with the drive mechanism of the sleeve 4. The point 10 here replaces to a certain extent the crank pin 10 of the control shaft or the crank shaft in the previous examples.

The motor cylinder 1 is not shown in section, as it is situated in the rear of the plane of the figure when point 10 and the motor shaft 7 are assumed to be situated in the plane of the drawing, and the rotation of the shaft 7 is assumed to be in clockwise direction when viewed from above. The cylinder 1 as well as the sleeve valve 4 are identical to those previously described. The piston is not visible; for the sake of clearness, the connecting links between the piston and the corresponding connecting pin 8 on the wobbler plate 27 (also in the rear of the plane of the drawing) has not been represented as it forms no part of the invention. Also, only one of the cylinders has been shown.

The motor shaft 7 is mounted in the engine casing 28 partially shown in section. The crank pin of the wobbler drive, as is well known, is inclined relative to the motor shaft, whereby the wobbler plate body executes its characteristic wobbling motion about its center, on which it is mounted on the ball joint 29. The wobbler plate body must be prevented by any suitable means from rotating relative to the engine casing, so that the connecting pins 8 for the pistons describe an oscillating movement in axial direction according to a spacial lemniscate. Other points of the wobbler plate body not situated in the wobbler plate plane describe slightly deviating unsymmetrical spacial loop curves, as for example the point 10 the movement of which is represented by the dash and dot line 100, the line 100' representing this movement in another projection, as seen from the left in Fig. 8.

Owing to the spacial curved path of the connecting point 10 from which the sleeve valve motion is derived, the connecting rod 11 must be provided with universal joints at both of its ends, at the point of connection 10 to the wobbler plate body, and at the point 12 where the connecting rod is articulated to a link 30 rotatably mounted on the engine casing. It would be possible for realising the movement of the sleeve according to the invention to couple the point 12 directly with the sleeve and to obtain the sleeve motion by the guide link 30. The paths of all points of the sleeve would then again be circular arcs as in the previous examples, or other lines, according to the kind of guide link which is used.

The guide link motion as represented in Fig. 8 is particularly suitable for obtaining a favorable sleeve motion. The free ends of the two links 30 and 32 mounted on the engine casing, are interconnected by means of an oscillatory coupling lever 13, and in any point of this lever an universal joint 15 is connected to a pin 16 projecting from the sleeve 4. When now the motor shaft 7 rotates and the point 10 of the wobbler plate describes its path 100, the universal joint 15, through the medium of the illustrated link motion which is some kind of lemniscoidal motion, describes a so-called coupling curve, illustrated in Fig. 8 by the dash and dot line 150. This curve 150 is approximately a straight line in its lower portion, but deviates quite suddenly from the straight direction in its upper portion. Each point of the sleeve valve describes a corresponding path which fully corresponds to the object to be attained by the invention. The desired conditions of acceleration are already substantially obtained in part by a suitable selection of the transmission ratios and the angles between the members of the guide motion 30, 13, 32, but these conditions are still further accentuated by the shape of the paths of all points of the sleeve (accordingly also of its ports 20 and 21) as determined by the guide motion; accordingly during the scavenging period the sleeve valve effects a relative intensive acceleration in axial direction, while during the compression and the combustion periods a reduced axial movement, but a moderate rotation of the sleeve valve is realised, which angular movement is useful for distributing the oil film and improving the temperature compensation, as well as for preventing the formation of scores on the piston, on the sleeve valve and on the cylinder wall.

The phase displacement for the required advance of the sleeve motion relative to the motor shaft is obtained by placing the connecting point 10 for coupling the wobbler plate to the sleeve in a meridian plane which, according to the desired advance of the sleeve, is situated angularly in advance of the connecting point 8 of the corresponding piston, so that the point 10 upon rotation of the motor shaft 7 arrives at its lower or inner dead center ahead of the corresponding piston.

The invention can be applied to motors with special ignition means or to Diesel type engines and is independent of the type of scavenging of the cylinders. The crank case may be used as a scavenging pump, or a separate scavenging pump or compressor may be employed.

The invention almost completely avoids the essential drawbacks which two-cycle motors heretofore always have had, even the greater heat stresses which are inherent in two-stroke cycle engines. The production of heat cannot be avoided, but the detrimental effects thereof can be reduced, as for example the extremely high piston temperatures and the accumulation of heat in proximity of the exhaust ports. Since the piston does not control the exhaust ports, it is not heated by the exhaust gases, which do not pass out of the cylinder in proximity to the piston head; the piston rings are less subject to be locked by burning, and the oil film between the piston, the sleeve valve and the cylinder are not burned away; the piston operates in a substantially cooler zone of the cylinder, while the parts of the sleeve valve situated close to the exhaust ports, are exposed to increased heating during the scavenging period only and are cooled during a relatively greater period of time on both external and internal sides by intimate contact with the cooled surfaces of the cylinder wall and cylinder head.

The unusually great sectional areas of the ports (above 70% of the piston area at a ratio of 1:1.25 between diameter and stroke), the considerable relief of exhaust gas pressure before entrance of the inlet ports, the short and straight gas paths owing to unidirectional scavenging, as well as the possibility of supercharging allow a change of gas and a degree of admission to be obtained which approaches that of four-stroke cycle engines. The conditions of operation for piston, cylinder, sleeve valve and its driving mechanism are extremely favorable. Owing to the fact that the movements of piston and sleeve valves have mostly the same direction, the relative velocity is smaller than the piston speed, the friction and wear of the piston, the sleeve valve and the cylinder are reduced, and the sleeve control mechanism is relieved. Owing to the small relative motion between the sleeve and the cylinder, and the redistribution of the laterally acting piston thrust on the several times greater sleeve surface, and since the oil film on the sleeve is not subject to deterioration by combustion gases, the cylinder may be of light metal casting without requiring a liner. This not only means a saving of weight and of cost, but an improvement of the cooling and a more uniform distribution of temperature over the circumference of the cylinder, also in air-cooled engines.

I claim:

1. In a two-cycle engine, the combination with a working cylinder and a piston reciprocating therein, said cylinder having exhaust ports at its outer end and inlet ports at its inner end, of a sleeve valve surrounding the piston, said sleeve valve having outlet openings periodically registering with said exhaust ports in the cylinder, and inlet openings cooperating with the upper edge of the piston and periodically registering with said inlet ports in the cylinder, the movement of said sleeve valve being slightly in advance of the movement of the piston, and means to impart to each point of the sleeve valve an oscillatory motion along a path at least partially deviating from the direction of the axis of the cylinder, the said oscillatory motion having a relatively greater acceleration in axial direction during the scavenging period, and a relatively smaller acceleration in axial direction during the compression and combustion periods when the inlet and exhaust ports are closed.

2. A two-cycle engine as defined in claim 1, wherein the direction of movement of the points of the sleeve valve during the compression and combustion periods deviates more from the axial direction than during the scavenging period.

3. In a two-cycle engine, the combination with a working cylinder and a piston reciprocating therein, said cylinder having exhaust ports at its outer end and inlet ports at its inner end, of a sleeve valve surrounding the piston, said sleeve valve having outlet openings periodically registering with said exhaust ports in the cylinder, and inlet openings cooperating with the upper edge of the piston and periodically registering with said inlet ports in the cylinder, the movement of said sleeve valve being slightly in advance of the movement of the piston, a crank mechanism actuated by the engine shaft at the same number of revolution as the engine shaft, and movement transmission members between said crank mechanism and said sleeve valve to impart to each point of the sleeve valve an oscillatory motion along a path at least partially deviating from the direction of the axis of the cylinder, the said oscillatory motion having a relatively greater acceleration in axial direction during the scavenging period, and a relatively smaller acceleration in axial direction during the compression and combustion periods when the inlet and exhaust ports are closed.

4. A two-cycle engine as claimed in claim 3, wherein said movement transmission members between said crank mechanism and sleeve valve comprise a connecting link coupled to the sleeve valve in such manner that the sleeve valve, in the scavenging period when its openings expose and close again the inlet and exhaust ports in the cylinder, is in proximity of its outer dead center position in which owing to the cinematic characteristics of crank mechanisms the acceleration of the sleeve motion is relatively greater than in the inner dead center position.

5. A two-cycle engine as claimed in claim 3, wherein the movement transmission members between the crank mechanism and the sleeve valve comprise toggle joints.

6. A two-cycle engine as claimed in claim 3, in which said crank mechanism comprises a crank pin mounted on the engine shaft.

7. A two-cycle engine as claimed in claim 3, wherein the movement of the sleeve valve is in advance of the piston movement at the inner dead center thereof.

8. In a two-cycle engine, the combination with a working cylinder and a piston reciprocating therein, said cylinder having exhaust ports at its outer end and inlet ports at its inner end, of a sleeve valve surrounding said piston, said sleeve valve having outlet openings periodically registering with said exhaust ports in the cylinder, and inlet openings cooperating with the upper edge of the piston and periodically registering with said inlet ports in the cylinder, the movement of said slide valve being slightly in advance of the movement of the piston, a wobbler plate drive connecting the piston to the engine shaft, and means for operatively connecting said wobbler plate to the sleeve valve to impart to each point of the sleeve valve an oscillatory motion along a path at least partially deviating from the direction of the axis of the cylinder, the said oscillatory motion having a relatively greater acceleration in axial direction during the scavenging period, and a relatively smaller acceleration in axial direction during the compression and combustion periods when the inlet and exhaust ports are closed.

9. A two-cycle engine as claimed in claim 8, comprising a plurality of cylinders each including a sleeve valve, a movement transmission mechanism controlling the motion of each sleeve valve, and coupling means for operatively connecting the movement transmission mechanism of each sleeve valve to a particular point of said wobbler plate.

10. A two-cycle engine as claimed in claim 8, comprising a plurality of cylinders each having a piston reciprocating therein, a connecting rod for operatively coupling each piston to a point of the wobbler plate, a sleeve valve mounted between each piston and corresponding cylinder, and means for operatively connecting each sleeve valve to a point of said wobbler plate situated angularly in advance of the point of connection of the corresponding piston to the wobbler plate with respect to the direction of movement of the engine shaft.

11. In a two-cycle engine, the combination with a working cylinder and a piston reciprocating therein, said cylinder having exhaust ports at its outer end and inlet ports at its inner end, said inlet ports comprising two series of axially superposed ports, of a sleeve valve surrounding the piston, said sleeve valve having outlet openings periodically registering with said exhaust ports in the cylinder, and inlet openings cooperating with the upper edge of the piston and registering during the scavenging period first with the inner one of said series of ports and then with the outer one of said series of ports, the movement of said sleeve valve being slightly in advance of the movement of the piston, and means to impart to each point of the sleeve valve an oscillatory motion along a path at least partially deviating from the direction of the axis of the cylinder, the said oscillatory motion having a relatively greater acceleration in axial direction during the scavenging period, and a relatively smaller acceleration in axial direction during the compression and combustion periods when the inlet and exhaust ports are closed.

12. In a two-cycle engine, the combination with a working cylinder and a piston reciprocating therein, said cylinder having exhaust ports at its outer end and inlet ports at its inner end, said inlet ports comprising two axially superposed series of ports with the ports of each series being separated by webs of the cylinder wall extending in a different direction from that of the webs of the other series, of a sleeve valve surrounding the piston, said sleeve valve having outlet openings periodically registering with said exhaust ports in the cylinder, and inlet openings cooperating with the upper edge of the piston and registering during the scavenging period first with the inner one of said series of ports and then with the outer one of said series of ports, the movement of said sleeve valve being slightly in advance of the movement of the piston, and means to impart to each point of the sleeve valve an oscillatory motion along a path at least partially deviating from the direction of the axis of the cylinder, the said oscillatory motion having a relatively greater acceleration in axial direction during the scavenging period, and a relatively smaller acceleration in axial direction during the compression and combustion periods when the inlet and exhaust ports are closed.

13. In a two-cycle engine, the combination with a working cylinder and a piston reciprocating therein, said cylinder having exhaust ports at its outer end and inlet ports at its inner end, of a sleeve valve surrounding the piston, said sleeve valve having outlet openings periodically registering with said exhaust ports in the cylinder, and inlet openings cooperating with the upper edge of the piston and periodically registering with said inlet ports in the cylinder, and motion transmitting mechanism for reciprocating said sleeve valve in phase relation with respect to the piston such that the axial movement of the valve is slightly in advance of that of the piston and has greater acceleration in axial direction during the scavenging period of the cycle than during the compression and combustion periods of the cycle when the inlet and exhaust ports are closed, said mechanism including means for imparting limited turning movement to the valve during its reciprocatory movements to cause any given point on the valve to travel the same path of movement in both directions of reciprocation.

14. A two-cycle engine as defined in claim 13 wherein the means for imparting said turning movement comprises a member operatively associated with said sleeve and arranged to oscillate about an anchorage point fixed in relation to the cylinder as the sleeve is reciprocated.

15. In a two-cycle piston engine of the kind having inlet and exhaust ports controlled by a sleeve valve, means for reciprocating said valve in predetermined phase relation with respect to the movement of the engine piston, said means comprising motion transmitting mechanism for imparting reciprocatory motion to the valve and a member operatively associated with the valve and arranged to oscillate about a fixed anchorage as the valve is reciprocated for modifying the rectilinear movement of the valve during its reciprocations so that any given point on the valve will follow the same curvilinear path in each direction of reciprocation of the valve.

EDMUND ERNST KARL SPARMANN.

REFERENCES CITED

The following references are of record in the file of this patent:

UNITED STATES PATENTS

| Number | Name | Date |
|---|---|---|
| 2,030,213 | Kinnucan et al. | Feb. 11, 1936 |
| 2,072,291 | Bischof | Mar. 2, 1937 |
| 2,134,285 | Kiffer | Oct. 25, 1938 |
| 2,140,454 | Howald | Dec. 13, 1938 |
| 2,230,407 | Kammer | Feb. 4, 1941 |
| 2,236,741 | Allyn | Apr. 1, 1941 |
| 2,242,871 | Raab et al. | May 20, 1941 |